US008305604B2

(12) United States Patent
McIntyre

(10) Patent No.: US 8,305,604 B2
(45) Date of Patent: Nov. 6, 2012

(54) SYSTEM AND METHOD OF NETWORK PRINTING

(75) Inventor: Kevin McIntyre, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1602 days.

(21) Appl. No.: 11/788,225

(22) Filed: Apr. 18, 2007

(65) Prior Publication Data

US 2008/0263675 A1  Oct. 23, 2008

(51) Int. Cl.
*G06F 15/00* (2006.01)
*G06F 7/04* (2006.01)

(52) U.S. Cl. .......................................... 358/1.15; 726/26

(58) Field of Classification Search ............... 358/1.15, 358/1.14, 1.13, 1.16, 1.18; 726/4, 28, 29; 715/835, 733, 866; 399/1, 8, 79, 80; 709/207, 709/228, 229
See application file for complete search history.

(56) References Cited

U.S. PATENT DOCUMENTS

| | | | |
|---|---|---|---|
| 5,291,243 A | 3/1994 | Heckman et al. | |
| 5,633,932 A | 5/1997 | Davis et al. | |
| 5,912,974 A | 6/1999 | Holloway et al. | |
| 6,826,692 B1 * | 11/2004 | White | 726/8 |
| 6,860,657 B2 | 3/2005 | Katamoto et al. | |
| 7,130,066 B1 | 10/2006 | Kanematu | |
| 2001/0042124 A1 * | 11/2001 | Barron | 709/227 |
| 2002/0042884 A1 | 4/2002 | Wu et al. | |
| 2002/0080959 A1 | 6/2002 | Weller | |
| 2003/0009672 A1 | 1/2003 | Goodman | |
| 2003/0167336 A1 * | 9/2003 | Iwamoto et al. | 709/229 |
| 2004/0128555 A1 * | 7/2004 | Saitoh et al. | 713/201 |
| 2005/0081137 A1 | 4/2005 | Ferlitsch | |
| 2005/0100378 A1 | 5/2005 | Kimura et al. | |
| 2005/0156750 A1 | 7/2005 | Kagawa | |
| 2005/0183141 A1 * | 8/2005 | Sawada | 726/16 |
| 2006/0007469 A1 | 1/2006 | Uruma | |
| 2008/0043274 A1 * | 2/2008 | Wang et al. | 358/1.14 |
| 2008/0225326 A1 * | 9/2008 | Kephart et al. | 358/1.15 |

FOREIGN PATENT DOCUMENTS

| | | |
|---|---|---|
| EP | 1197828 A1 | 4/2002 |
| EP | 1220076 A2 | 7/2002 |
| EP | 1531378 A2 | 5/2005 |
| WO | WO 02/32047 A1 | 4/2002 |

* cited by examiner

*Primary Examiner* — Saeid Ebrahimi Dehkordy

(57) ABSTRACT

A method of printing a document, the method includes assigning a permission classification to a document to be printed; assigning a user permission profile to a user; and determining from the user permission profile and the permission classification of the document whether the user is authorized to print the document. Another method of printing a document includes assigning a permission classification to a document to be printed; assigning a printer permission profile to each of a number of network printers; and determining from the permission profile of the network printer and the permission classification of the document whether a the network printer is authorized to print the document.

20 Claims, 9 Drawing Sheets

SYSTEM AND METHOD OF NETWORK PRINTING

BACKGROUND

The advent of computer networks has dramatically improved the way many people work, study, and recreate in today's society. This improvement is particularly evident in the ability of computer networks to make shared resources available to constituent workstations. Sharing resources generally reduces costs and provides more efficient overall usage of those resources.

One particular shared resource used extensively in computer networks is that of network printers. Network printers allow many different users connected to a computer network to print documents from personal workspaces without requiring each user to maintain his or her own separate printer. However, shared printers may present some security concerns. For example, when documents of varying security levels are sent to the same printer, a person without clearance or permission to view a high-security document may mistakenly or maliciously retrieve or attempt to view the document.

Many prior solutions to network printing security generally aim to ensure that documents transmitted from a workstation to a remote printer are secure and do not reside on the output tray of a printer before the user arrives to retrieve that document. Additional security concerns may include those of ensuring that users have permission to print confidential documents and avoiding confidential documents being printed where they may be accessed by people without permission to view the contents.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, it may be desirable to ensure that a user has sufficient authorization to print a document before allowing the document to be printed. Additionally, it may be desirable to ensure that a printer is sufficiently secure prior to printing a confidential document.

To address these and other issues, the present specification discloses permission based systems and methods of network printing. The systems and methods allow verification of document permission classifications and permission profiles of users and printers prior to printing a document. Documents not meeting predetermined permission criteria are automatically rejected and printing is cancelled.

As used in the present specification and in the appended claims, the term "permission classification" refers to a status assigned to data or a document indicative of a level of authorization needed by a user to initiate a print job for printing that document or a level of authorization needed by a printer to print that document or data.

As used in the present specification and in the appended claims, the term "permission profile" refers to a status assigned to users of a network or other network resources, such as printers, indicative of the authorization of the network users or resources to print or modify documents or data of certain permission classifications.

A trusted network administrator may be tasked with assigning the user and printer permission profiles described herein. Documents may be assigned permission classifications by their creators or other network or organization authorities.

Also, as used herein and in the appended claims, the term "printer" will be used broadly to refer to any type of printer, facsimile machine, scanner, plotter, copier, multi-function peripheral, etc.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of network printing.

Exemplary Systems

Figure 1:
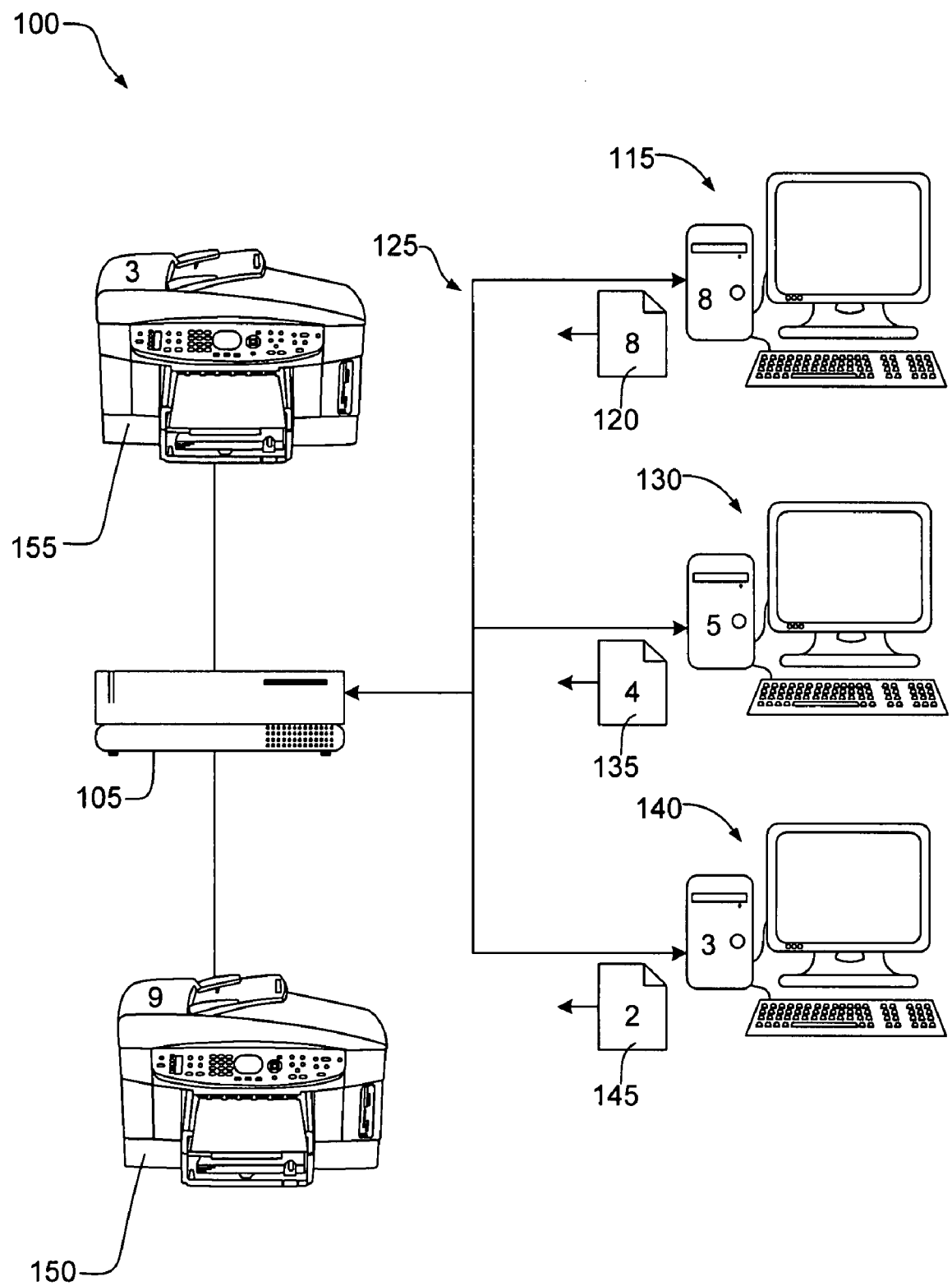
FIG. 1 is a diagram of an exemplary network according to principles described herein.

Referring now to FIG. 1, an exemplary system (100) for network printing comprises a computer network (125) interconnecting at least one server (105) and any number of networked computers or workstations (e.g., 115, 130, 140). As will be appreciated by those skilled in the art, a computer network may have any number of various components including, but not limited to, servers, disc arrays, laptops, desktops, routers, etc. The principles disclosed herein may be implemented in any computer network. The network configuration of FIG. 1 is provided merely for purposes of example and discussion, and is not intended to limit the type or configuration of network to which the principles disclosed herein apply. As used herein, "workstation" refers generally to a network node with a full user interface where a user works, as opposed to a "server" which generally refers to a network node that provides electronic services to workstations with or without a full user interface and without being a station at which a network user typically works.

The computer network may comprise any one of many different network protocols available to enable communication between the workstations (115, 130, 140), the server (105) and any other network components. Examples of network protocols that may be used with computer networks of this specification include, but are not limited to, Ethernet, asynchronous transfer mode, fiber distributed data interface, token-based protocols, LocalTalk, and combinations thereof.

The exemplary system (100) further comprises a number of network printers, for example, first and second network printers (150, 155) in communication with the server (105). In this case, the server (105) functions as a printer server for routing and managing print jobs being executed by the printers (150, 155) The network printers (150, 155) are configured to receive print data from the server (105) and produce visual representations of the print data on physical print media.

The server (105) functions as a print server by providing the first, second, and third workstations (115, 130, 140) access to the network printers (150, 155). The server (105) may act as a buffer, holding the print data received from the workstations (115, 130, 140) in memory until one of the network printers (150, 155) is ready to receive the data. The server (105) may maintain a queue of jobs to be printed. In some embodiments, the server (105) provides print data to network printers (150, 155) in the same order that the print data is received by the server (105). In other embodiments, the print data may be transmitted to the network printers (150, 155) in an order determined by relative priorities assigned to different print jobs or network users.

In some embodiments, the server (105) may function only as a print server. In other embodiments, the server (105) may also function as a fileserver by allowing users of the workstations (115, 130, 140) to access and/or modify shared data.

In the exemplary system (100) shown, each of the workstations (115, 125, 130) is transmitting a document (120, 135, 145, respectively) to the server (105) to be printed by one of the network printers (150, 155). The handling of these print jobs, according to the principles described herein, will be discussed below.

Each workstation user and network printer (150, 155) of the exemplary system (100) is assigned a permission profile, and each document (120, 135, 145) receives a permission classification. In this particular embodiment, the permission profiles of each of the workstation users include a number representative of that user's relative authorization level. For example, a user with a lower permission profile number would have more restrictions placed on his or her printing activities than a user with a higher permission profile number.

It should be understood that while the permission profiles and classifications of the present exemplary system (100) are described in relation to numbers, many other types of permission profiles and/or classifications may be used in conjunction with the principles of the present specification, including, but not limited to, ranges of numbers, boolean permission classifications and profiles (e.g., authorized, not authorized), levels of gradation or confidentiality (e.g., confidential, classified, secret, top secret, etc.), and attributes relating to the document to be printed (e.g., amount of color, number of pages, etc.).

The permission profiles of the workstation users of the present embodiment are shown in the Figure as numerals on the corresponding workstations indicating a maximum authorization level of the user of that workstation. It will be understood by those skilled in the art that the permission profile of a user may be associated specifically with that user's assigned workstation, but may also be associated with login credentials assigned to that user. Consequently, no matter which workstation the user accesses to login to the network (300), the login credentials of that user (e.g., user name and password) will determine the user permission profile for print jobs transmitted from that workstation while that user is logged in.

In the example of FIG. 1, the user of the first workstation (115) has a user permission profile providing authorization to print documents having permission classifications up to, and including the number "8." The user of the second workstation (135) has a user permission profile providing authorization to print documents having permission classifications up to, and including the number "5." The user of the third workstation (145) has a user permission profile providing authorization to print documents having permission classifications up to, and including the number "3."

As also shown in the figure, one network printer (150) is assigned a printer permission profile providing authorization to print documents having permission classifications up to, and including the number "9," while the other network printer (155) is assigned a printer permission profile providing authorization to print documents having permission classifications up to, and including the number "3." Consequently, the latter network printer (155) can only be used to print documents of relatively low sensitivity or confidentiality, i.e., having a relatively low (3 or less) permission classification. Thus, a user trying to improperly gain access to a document of higher permission classification would not be able to use that printer (155) to produce a hardcopy of that document. This clearly helps deter unauthorized access to that document.

Each of the documents (120, 135, 145) can be assigned permission classification indicative of the authorization a user and/or a network printer must have to successfully print that document. For example, a document having a permission classification of "5" may not be printed by a printer having a printer permission profile any lower than "5," e.g., printer (150). Likewise, a user having a user permission profile below "5" may not successfully print a document having a permission classification of "5" or higher, e.g., the user of workstation (140) with a user permission profile of "3."

Thus, as shown in the Figure, the document (120) to be printed by the user of the first workstation (115) has a permission classification of "8," the document (135) to be printed by the user of the second workstation (130) has a permission classification of "4," and the document (145) to be printed by the user of the third workstation (140) has a permission classification of "2." These permission classifications will dictate which printers, based on the printer permission profile, can be used to print those documents. These permission classifications will also determine which users, based on the user's permission profile, can successfully submit each of these documents for printing.

Figure 2:
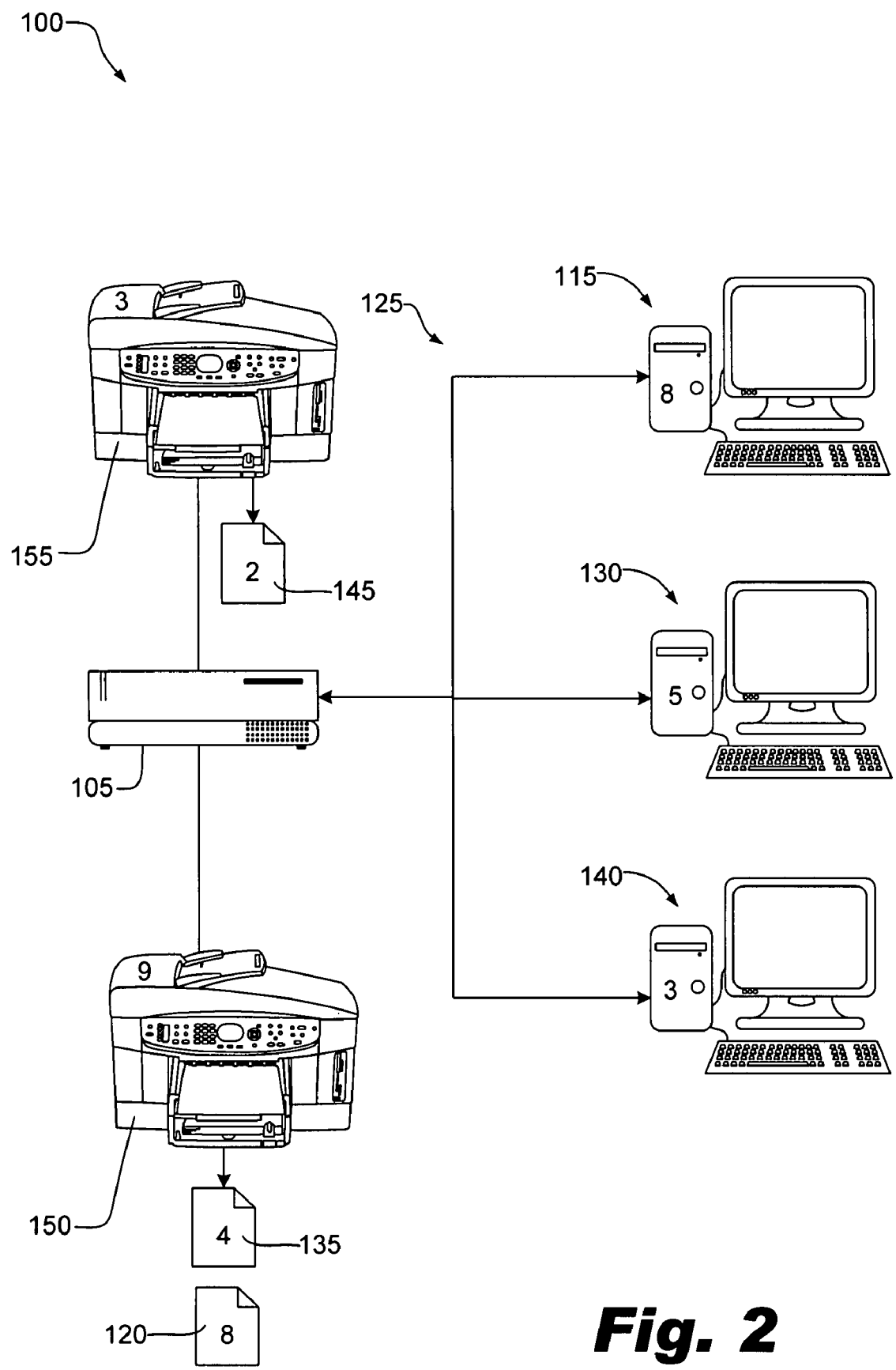
FIG. 2 is a diagram of an exemplary network according to principles described herein.

Referring now to FIG. 2, the exemplary system (100) is shown after the documents (120, 135, 145) have been sent to the network printers (150, 155). In this particular embodiment, the network printer (150) having the permission profile allowing the printing of documents with classifications up to "9" printed the documents (120, 135) having permission classifications of "8" and "4," respectively. The network printer (155) having the permission profile allowing the printing of documents with classifications up to "3" printed the document (145) having a permission classification of "2."

Thus, the documents (120, 135, 145) were sent to network printers (150, 155) having printer permission profiles with printer permission profiles to allow printing of the respective documents (120, 135, 145) based on document permission classification. This routing of print jobs based on printer permission profile and document classification may be conducted automatically by the server (105). In other examples, a network user may direct a document to a particular printer, with the server (105) then determining whether that printer has a sufficient printer permission profile to print that document, based on the document's permission classification.

In some embodiments, documents sent to the server (105) may only be printed if the permission profile of the designated destination network printer (150, 155) provides sufficient authorization for the document to be printed. Thus, if the user selects a printer that does not have a sufficiently high permission profile for the document being printed, the print job is simply cancelled by the server (105). In other embodiments, the server (105) may reroute documents originally intended to be printed at printers having insufficient authorization to printers having adequate and appropriate permission profiles.

In some embodiments, the server (105) will also verify that the workstation users transmitting the documents (120, 135, 145) to the server (105) to be printed have sufficient user permission profiles to allow them to print the corresponding documents (120, 135, 145) based on each document's permission classification. As above, the server (105) will cancel any print job if the user submitting that print job has a user permission profile inadequate to authorize printing of that document based on the document's permission classification. The server (105) may also be programmed to alert a network administrator or other security personnel that a user has attempted to print a document with a grater permission classification that permitted by that user's permission profile. Such an alert may be, for example, by email, instant messaging, text messaging or any other communication means.

Figure 3:
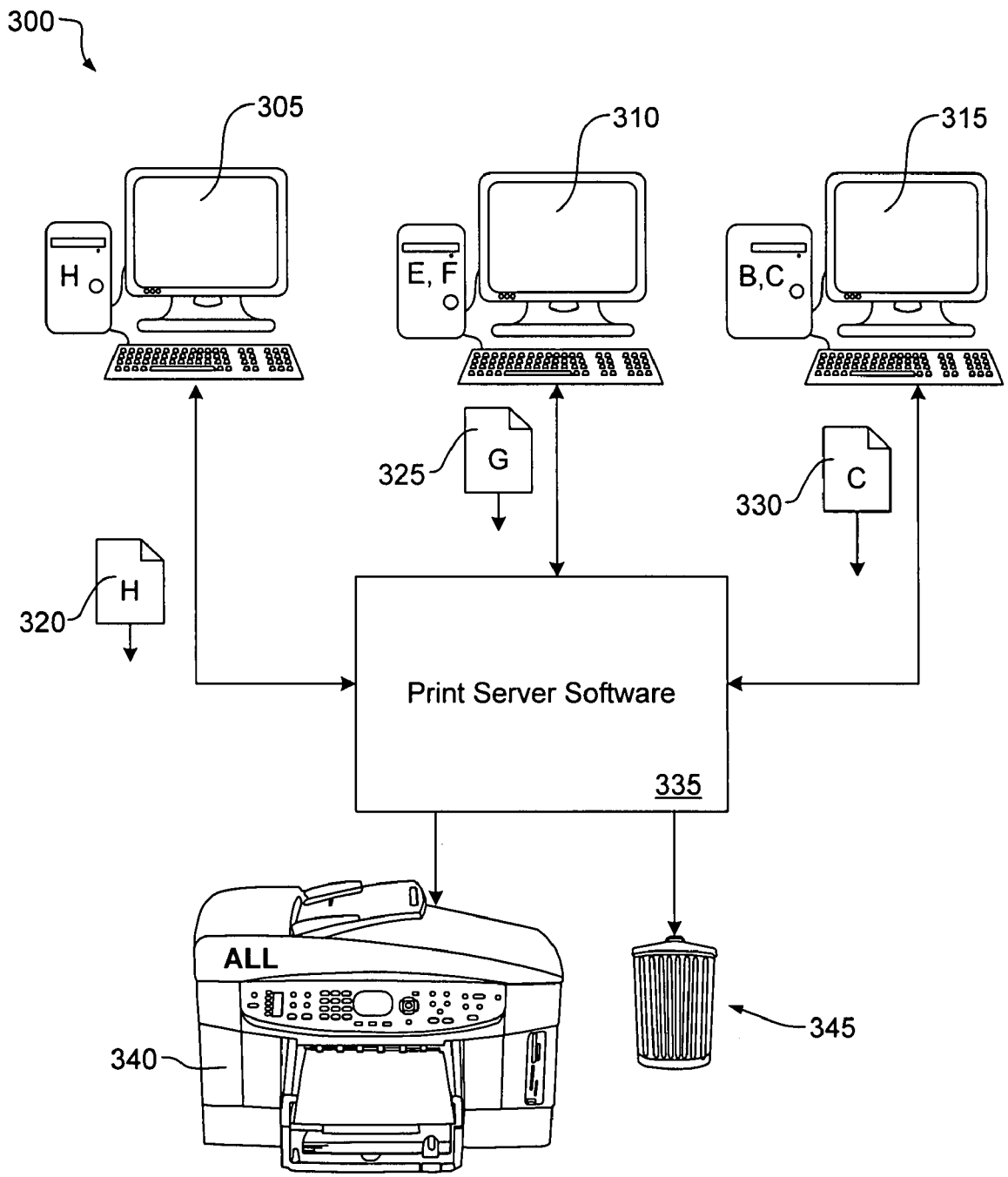
FIG. 3 is a diagram of an exemplary network according to principles described herein.

Referring now to FIG. 3, another exemplary system (300) of secure network printing is shown. The system (300) comprises a number of work stations, for example, first, second, and third workstations (305, 310, 315), in communication with print server software (335). The print server software (335) may be executed by any of a number of possible hardware devices, such as a dedicated hardware print server device, a network file server device, a network printer (340) having built-in print server functionality, a print server device designed to plug into a network printer (340), or combinations thereof.

The print server software (335) comprises algorithms to receive print data sent from the workstations (305, 310, 315), maintain a queue of documents to be printed by a network printer (340), and transmit print data of documents in the queue to the network printer (340) to be printed. The print server software (335) further comprises the capability of automatically rejecting document data from the print queue and cancelling print jobs that do not meet certain criteria. Deletion of a print job is represented in FIG. 3 by the trash receptacle (345) shown in communication with the print server software (335). The print server software (335) may further comprise the ability to securely delete data from a print job that has been cancelled such that the securely deleted data is not recoverable from the memory of the printer server, printer or any other device executing or controlled by the print server software (335). In one embodiment, data from the deleted print job may be written over with random bits to achieve the secure deletion described.

As described above, each user of the workstations (305, 310, 315) is assigned a user permission profile represented in the Figure by one or more letters on each of the workstations (305, 310, 315). In the present exemplary embodiment, the user of the first workstation (305) comprises a permission profile of "H," meaning that the user of the first workstation (305) is only authorized to print documents with the permission classification of "H." The user of the second workstation (310) comprises a permission profile with authorization to print documents classified as either "E" or "F," and the user of the third workstation (315) comprises a permission profile with authorization only to print documents with the permission classification of "B" or "C."

Documents (320, 325, 330) sent by the workstations (305, 310, 315) to the print server software (335) comprise permission classifications indicated in the Figure by letters on the documents (320, 325, 330). The document (320) sent by the user of the first workstation (305) has a permission classification of "H," the document (325) sent by the user of the second workstation (310) has a permission classification of "G," and the document (330) sent by the user of the third workstation (315) has a security classification of "C." The network printer of the exemplary system (300) comprises a permission profile enabling it to print documents of any classification.

As the documents (320, 325, 330) are sent to the print server software (335), the print server software (335) is configured to examine the permission classifications of the documents (320, 325, 330) and the user permission profiles of the corresponding users of the workstations (305, 310, 315) who are submitting documents for printing. In this particular embodiment, the print server software (335) is configured to send document data to the network printer (340) only when the document has a permission classification that matches the authorized permission profile of the user attempting to print the document.

The document permission classifications may be embedded in document data sent to the print server software (335). In some embodiments, the permission profiles of individual workstation users are sent together with the document data to the print server software (335). In other embodiments, the print server software may maintain a database of network users with their associated permission profiles.

Documents or print jobs received by the print server software (335) that have a permission classification which matches the permission profile of the corresponding user will be printed. Document of print jobs received by the printer server software (335) with a permission classification that does not match the corresponding workstation user will be detected by the print server software (335) and then rejected from the print queue. Thus, in the example of FIG. 3, document (320) will be printed because the document classification "H" matches the corresponding user's permission profile "H." Document (330) will also be printed because the document classification "C" matches the corresponding user's permission profile which includes both "B" and "C." However, document (325) will not be printed because the document classification "G" does not match the corresponding user's permission profile of "E" and "F."

Figure 4:
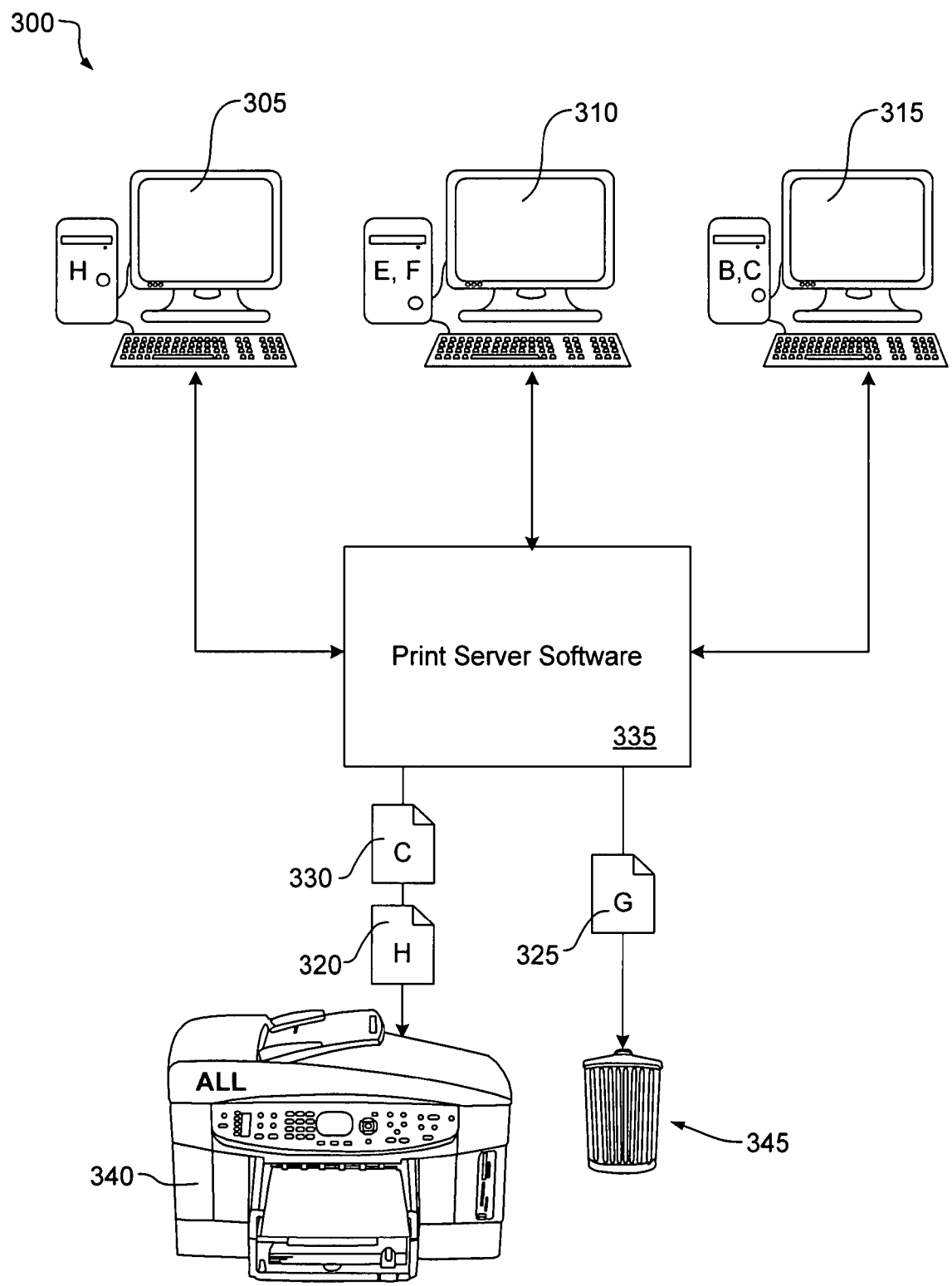
FIG. 4 is a diagram of an exemplary network according to principles described herein.

This result is illustrated in FIG. 4. In FIG. 4, the exemplary system (300) of FIG. 3 is shown after the documents (320, 325, 330) have been received and processed by the print server software (335). The document (320) submitted to the print server software (335) from the user of the first workstation (305) has a permission classification of "H," and the user of the first workstation (305) has a permission profile authorizing the user to print documents classified as "H." Therefore, the print server software (335) allows the document (320) to be sent to the network printer (340) for printing.

The document (325) submitted to the print server software (335) from the user of the second workstation (310) has a permission classification of "G," and the user of the second workstation (310) has a permission profile authorizing the user to print documents with permission classifications of "E" or "F." As the user submitting the document (325) is not authorized to print documents with a permission classification of "G," the print server software rejects the document (325) from the print queue and cancels its corresponding print job. As shown in FIG. 4, the print job for document (325) may be securely deleted as described herein.

The document (330) submitted to the print server software (335) from the user of the third workstation (315) has a permission classification of "C," and the user of the third workstation (315) has a permission profile authorizing the user to print documents with permission classifications of "B" or "C." Therefore, the print server software (335) allows the document (330) to be sent to the network printer (340) for printing.

Figure 5:
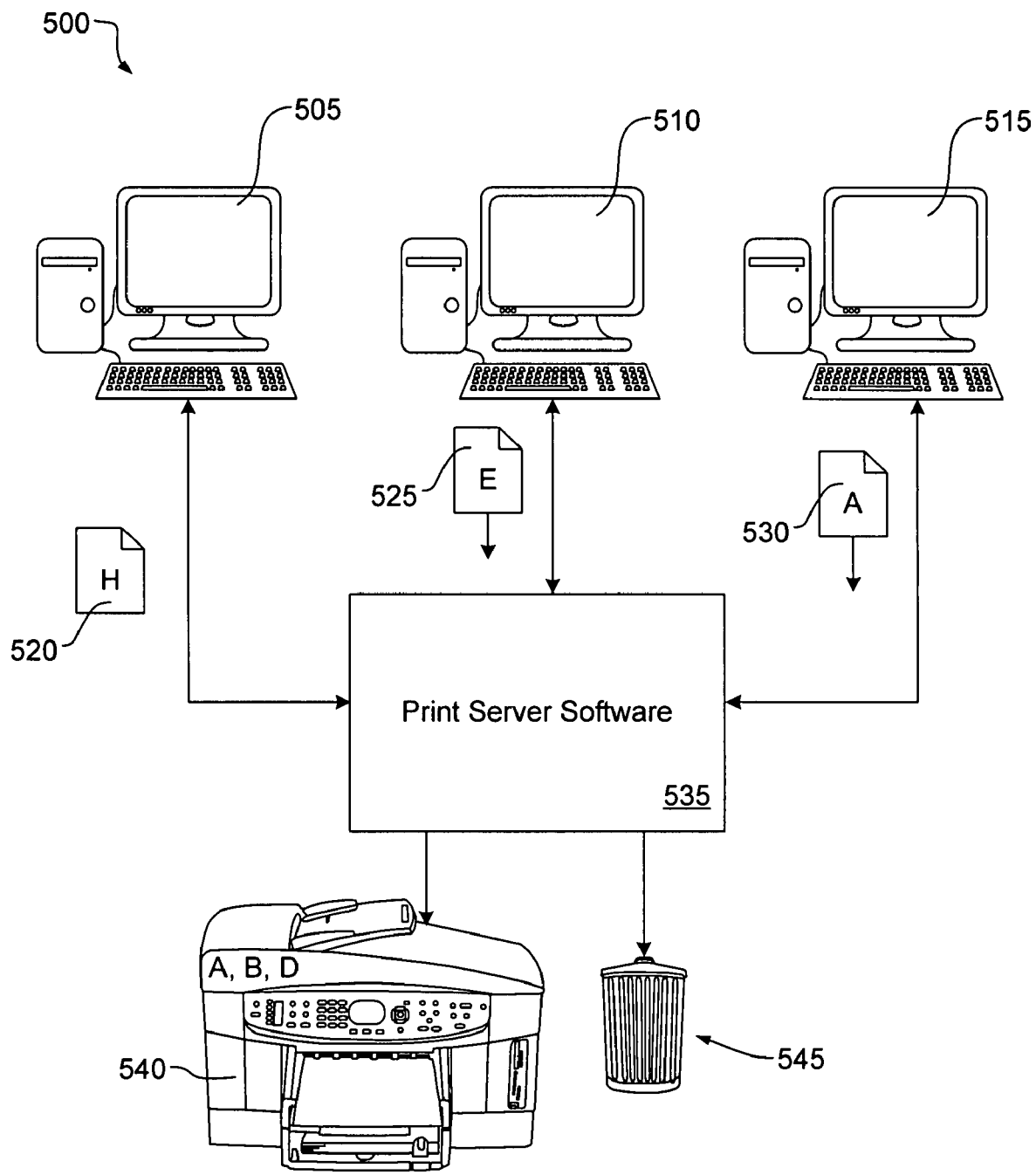
FIG. 5 is a diagram of an exemplary network according to principles described herein.

Referring now to FIG. 5, another exemplary system (500) is shown. Like previous exemplary embodiments, the system (500) comprises a number of workstations, for example, first, second, and third workstations (505, 510, 515), in communication with print server software (535) which, in turn, is in communication with a network printer (540) and comprises the capability of automatically rejecting document data from the print queue and cancelling print jobs that do not meet certain criteria, as represented by the trash receptacle (545).

A user of the first workstation (505) is shown sending a document (520) having a permission classification of "H" to the print server software (535) to be printed. Likewise, a user of the second workstation (510) is shown sending a document (525) having a permission classification of "E" to the print server software (535), and a user of the third workstation (515) is shown sending a document (530) having a permission classification of "A" to the print server software (535).

The network printer (540) comprises a permission profile giving it authorization to print only documents having permission classifications of "A," "B," or "D" in this embodiment. The print server software (535) is configured to prevent the network printer (540) from receiving documents to print having a permission classification that is not authorized by the permission profile of that network printer (540).

Figure 6:
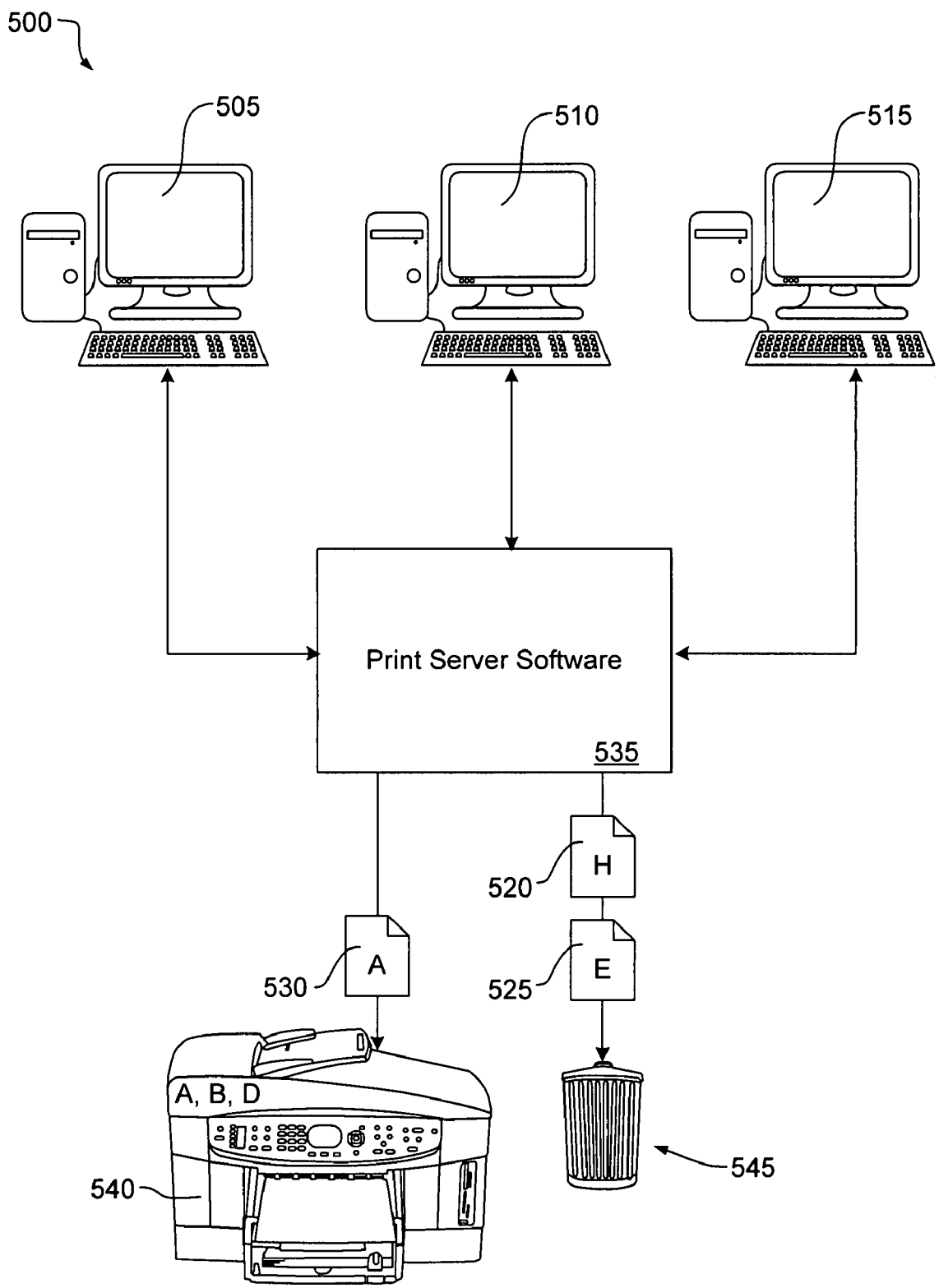
FIG. 6 is a diagram of an exemplary network according to principles described herein.

Referring now to FIG. 6, the exemplary system (500) of FIG. 5 is shown after the document print jobs have been processed by the print server software (535). The print server software (535) places the document (530) from the user of the third workstation (515) in the print queue of the network printer (540), as it is the only one of the documents (520, 525, 530) having a permission classification included in the permission profile of network printer (540). The documents (520, 525) from the users of the first and second workstations (505, 510, respectively) have permission classifications for which the network printer (540) is not authorized to print, and the print server software (535), therefore, automatically rejects and/or discards the documents (520, 525) from the printing queue for the network printer (540).

In some embodiments, the rejected documents (520, 525) may be sent automatically to a network printer having a permission profile that authorizes the printing of the documents (520, 525). In other embodiments, the users (505, 510) of the first and second workstations (505, 510) may be allowed to choose between sending the documents (520, 525) to other network printers or cancelling the printing of the documents (520, 525) entirely. Still in other embodiments, appropriate security precautions may be taken against the users of the first and second workstations (505, 510) such as reporting details of the failed print attempt, as described above, and/or restricting network access until the nature of the inappropriate print request is ascertained.

For ease of explanation, the preceding discussion has separately described the comparison of document permission classification to either a user or printer permission profile. However, it will be appreciated by those skilled in the art that an exemplary system as described herein may include both aspects, i.e., the comparison of a document permission classification to both a printer and user permission profile before printing is permitted or denied. This will be further described below in connection with FIG. 10.

Exemplary Methods

Figure 7:
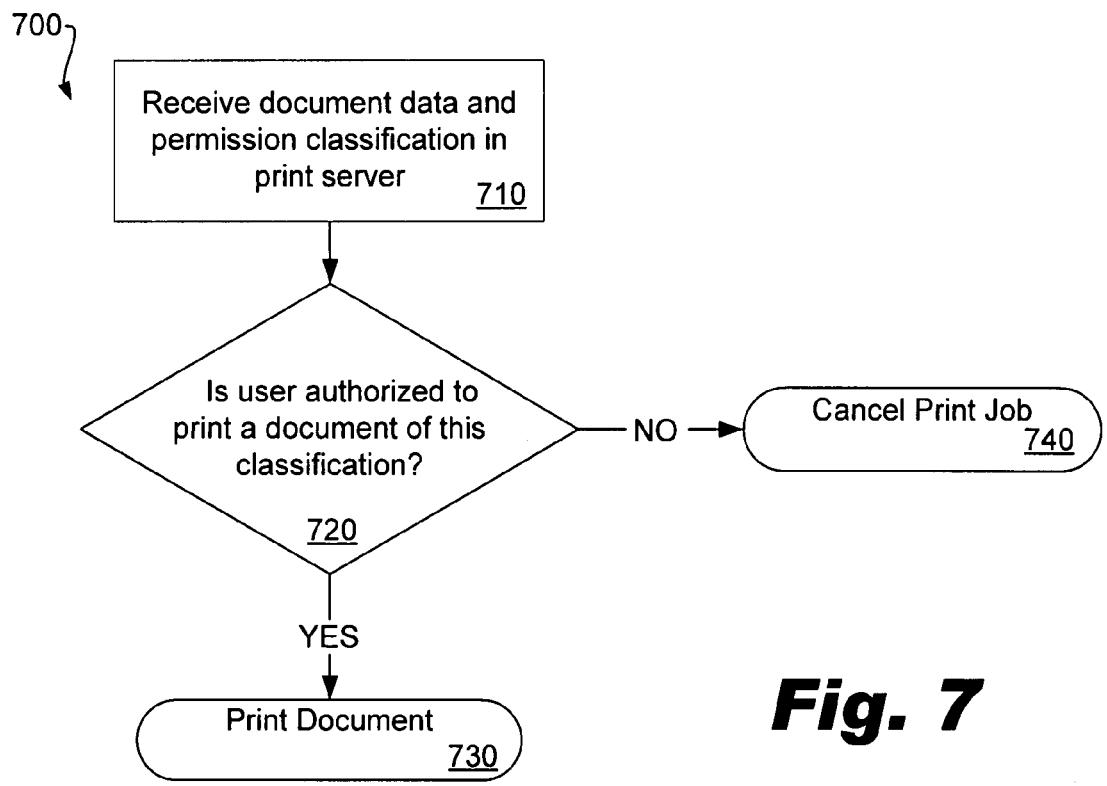
FIG. 7 is a flowchart illustrating an exemplary embodiment of a method of printing a document according to principles described herein.

Referring now to FIG. 7, an exemplary method (700) of printing a secure document is illustrated. The exemplary method (700) provides one way to prevent users from printing documents without authorization. The documents may be unauthorized to certain users for security, content, cost of printing, or other factors. In the exemplary method (700), each user of a network is assigned a permission profile, and each document to be printed is assigned a permission classification.

Document data, i.e., a print job, and a corresponding permission classification are received (step 710) into a print server or print server software as described herein. It is then determined (step 720) if the user is authorized to print a document having the permission classification of the document to be printed. Such authorization parameters are defined in the user's permission profile.

In the event that the user's permission profile does not provide authorization to print a document having the permission classification of the document to be printed, the print job is cancelled (step 740) and the document data is not placed into the print queue of the designated network printer. As noted above, this action may also include notification to security personnel that the user has attempted to print the document without authorization and/or disabling access of the user to the network. If, on the other hand, the user's permission profile does provide authorization to print a document having the permission classification of the document to be printed, the document data is put into the print queue of a designated network printer and printed (step 730).

Figure 8:
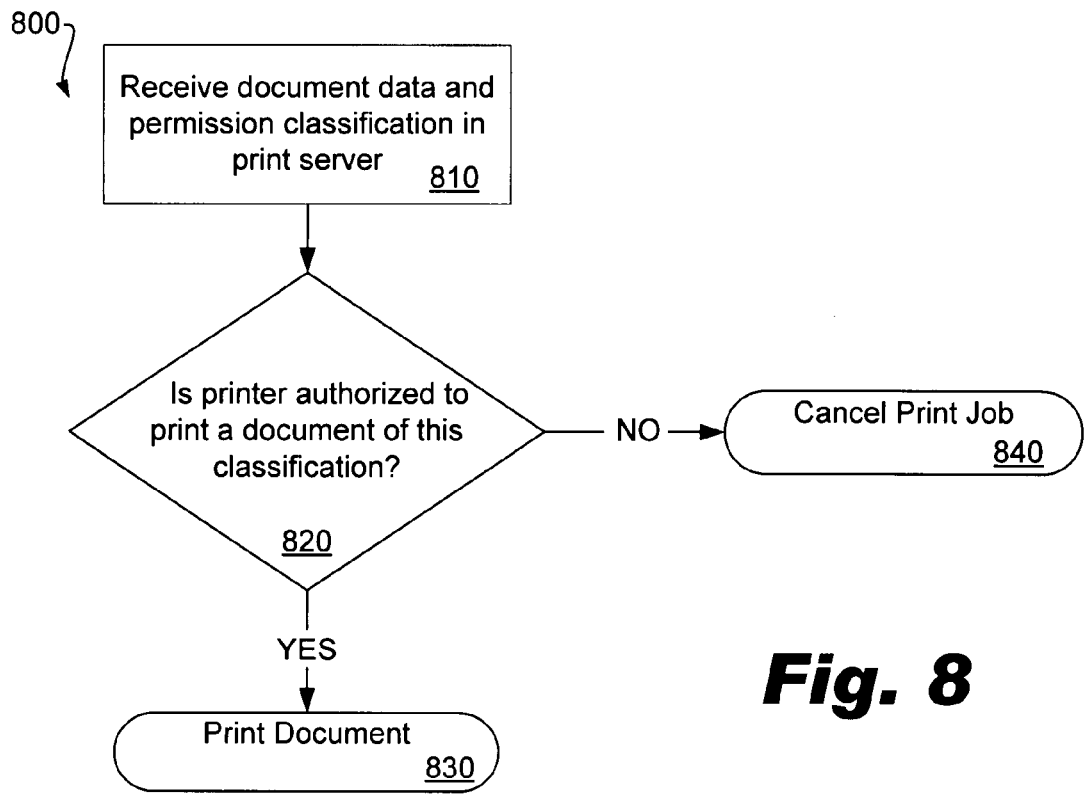
FIG. 8 is a flowchart illustrating an exemplary embodiment of a method of printing a document according to principles described herein.

Referring now to FIG. 8, another exemplary method (800) of printing a document is shown. In this particular exemplary method (800), a user may only print a document on a network printer if the document meets certain criteria for printing at the designated printer. Whether the document meets these criteria is determined by comparing the permission classification of the document with the permission profile of the designated network printer.

Document data and its permission classification are received (step 810) into a print server or print server software. It is then determined (step 820) if the designated network printer is authorized to print a document having the classification of the document to be printed. In the event that the permission profile of the designated network printer does not provide authorization to print a document having a permission classification of the document data received in the print server, the print job is cancelled (step 840) and the document data is not placed into the print queue of the designated network printer. Appropriate security precautions may also be taken as described herein. If, however, the permission profile of the designated network printer authorizes the printer to print a document having the permission classification of the document received into the print server, the document data is put into the print queue of the designated network printer and printed (step 830).

Figure 9:
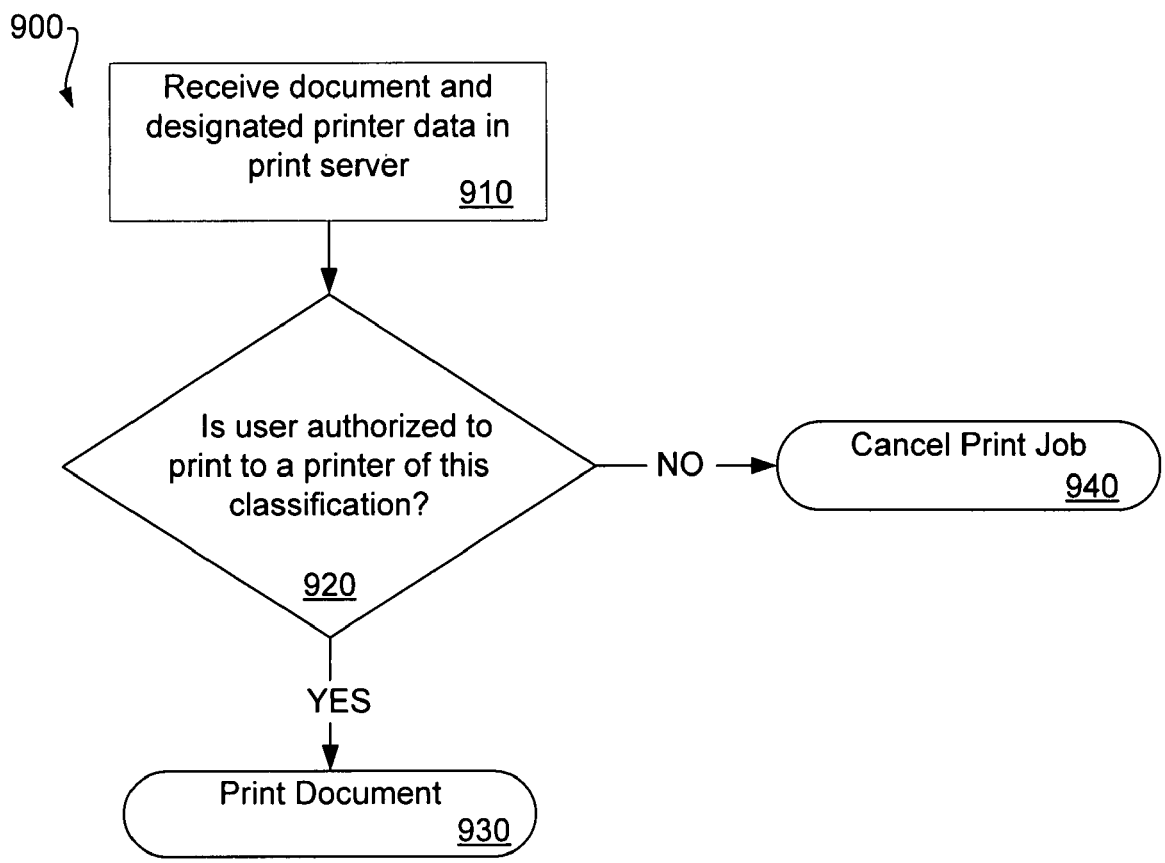
FIG. 9 is a flowchart illustrating an exemplary embodiment of a method of printing a document according to principles described herein.

Referring now to FIG. 9, another exemplary method (900) of printing a document is shown. In this particular exemplary method (900), a user may only print a document on a network printer if he or she has sufficient authorization, as defined by his or her permission profile.

As in the embodiments of FIGS. 7-8, document and designated printer data are received (step 910) from a user having an assigned permission profile into a print server or print server software, as described herein. It is then determined (step 920) if the user has sufficient authorization to print to the designated network printer. This is done by comparing the user's permission profile with the printer's permission profile according to any of the methods described herein.

In the event that the permission profile of the user does not provide sufficient authorization to use the designated network printer, the print job is cancelled (step 940) and the document data is not placed into the print queue of the designated network printer. If the permission profile of the user does provide sufficient authorization to use the designated printer, the document data is put into the print queue of the designated network printer and printed (step 930).

Figure 10:
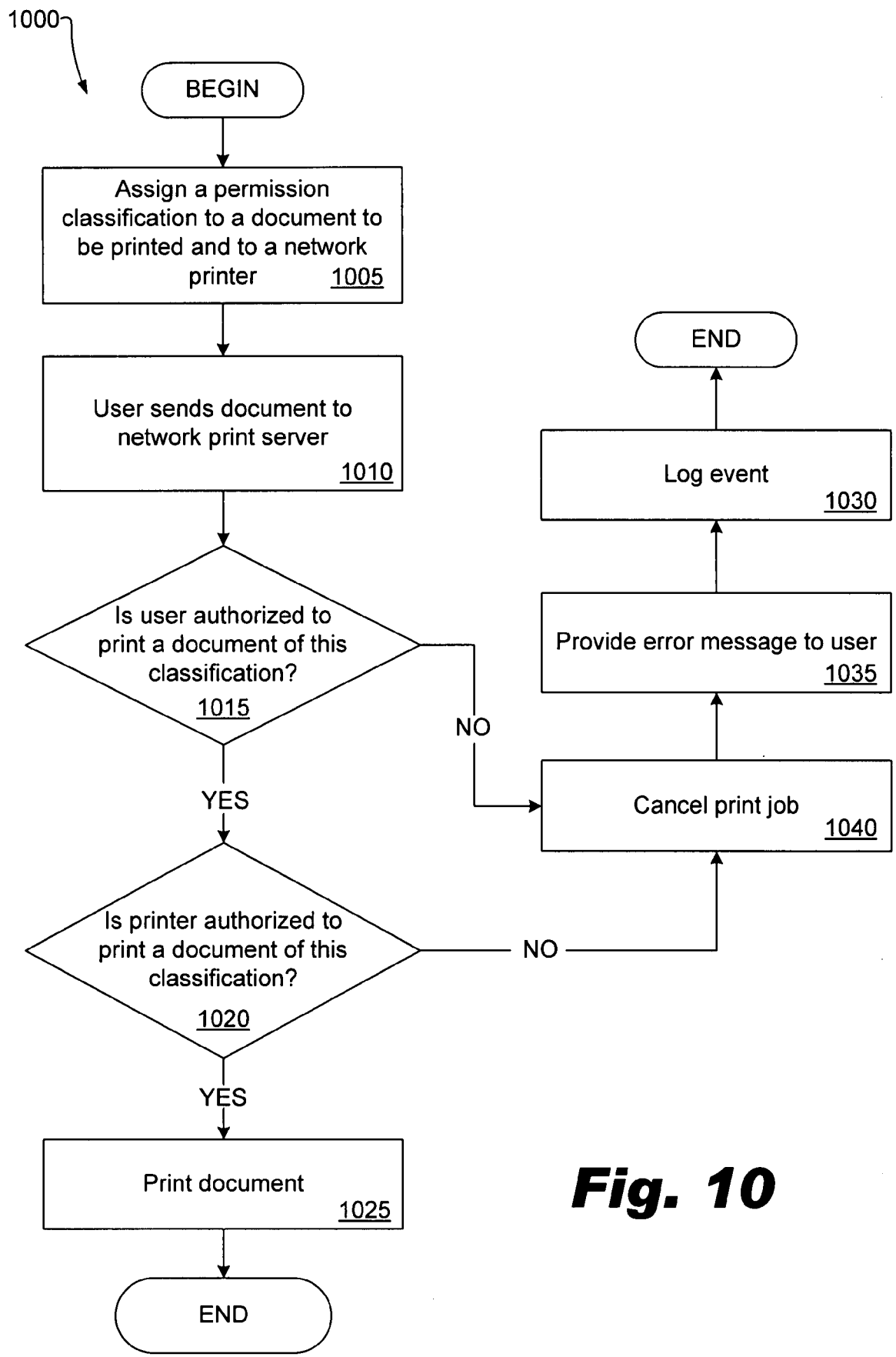
FIG. 10 is a flowchart illustrating an exemplary embodiment of a method of printing a document according to principles described herein.

Referring now to FIG. 10, another exemplary method (1000) of printing a document is shown. In the exemplary method (1000), a user and a network printer are assigned (step 100x) permission profiles. The permission profiles may provide information on what classification of documents the user and the printer may print. A permission classification is assigned (step 1005) to a document to be printed. The permission classification may be indicative of relative security, "need to know" status, printing job expense, or other variables that determine authorization to print a document.

The user sends the document (step 1010) to a network print server or print server software as described herein. After receiving the document data from the user, the network print server has the document data or print job and the permission classification information corresponding to the print job. The network print server may further have identified the user sending the document data and retrieve the user's corresponding permission profile from a database or from the document data itself.

It is then determined (step 1015) if the user is authorized to print a document having the permission classification of the document received in the network print server. In the event that the permission profile of the user does not grant sufficient authorization to print the document, the print job is cancelled (step 1040), an error message is provided (step 1035) to the user, and event data is logged (step 1030). The error message may notify the user of the failed printing operation, and the logged event data may inform network administrators of a possible security concern. Other appropriate security measures may also be automatically taken as described herein.

However, if the permission profile of the user does grant the user sufficient authorization to print the document, it is then determined (step 1020) if the permission profile of the network printer authorizes the printer to print a document having the permission classification of the document received in the print server. If the network printer does not have sufficient authorization to print the document, the print job is cancelled (step 1040), an error message may be provided (step 1035) to the user, and the event may be logged (step 1030). Again, appropriate security measures may also be taken.

In the event that the user has permission to print the document but the document may not be printed on the designated network printer, the error message may provide additional printing options to the user, such as a list of alternate network printers having a permission profile authorizing the printing of the document.

If the permission profile of the network printer authorizes it to print the document, the document data are put in the print queue of the designated network printer and the document is printed (step 1025).

It should be noted that the steps involving the determination of user and printer authorization (steps 1015, 1020) are not limited to any one apparatus or network element. Examples of network elements capable of performing such evaluations include, but are not limited to, workstations, file servers, print servers, printers, and combinations thereof. In some embodiments, the permission profile corresponding to a user may be part of a network database and included with files sent by the user to the print server. In other embodiments, the permission profile of a user may be ascertained by the user presenting a card, tag, fingerprint, retina scan or other identification apparatus to a network device. In still other embodiments, a password or other key presented by the user to the network may be used to verify or ascertain the permission profile of the user.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of printing a document, said method comprising:
   assigning a permission classification to a document to be printed;
   assigning a user permission profile to a user; and
   determining from said user permission profile and said permission classification of said document whether said user is authorized to print said document.

2. The method of claim 1, wherein said user permission profile comprises a permission classification, wherein said user is authorized to print documents having a permission classification matching that specified in said user's permission profile or any lesser classification.

3. The method of claim 1, wherein said user permission profile comprises at least one permission classification, wherein said user is authorized to print only those documents having a permission classification matching said at least one permission classification specified in said user permission profile.

4. The method of claim 1, wherein said method further comprises cancelling said document from printing upon determining that said user is not authorized to print said document.

5. The method of claim 4, further comprising securely deleting data of a print job for said document.

6. The method of claim 5, further comprising providing an error message to said user.

7. The method of claim 5, further comprising alerting security personnel of said user's failed attempt to print said document.

8. The method of claim 5, further comprising disabling said user's access to a corresponding computer network in response to said user's failed attempt to print said document.

9. A method of printing a document, said method comprising:
   assigning a permission classification to a document to be printed, said document permission classification being embedded in document data of said document;
   assigning a printer permission profile to each of a number of network printers; and
   determining from said permission profile of said network printer and said permission classification of said document whether a said network printer is authorized to print said document.

10. The method of claim 9, wherein said printer permission profile comprises at least one scaled permission classification, wherein a corresponding network printer is authorized to print documents having a scaled permission classification equal to or lesser than said at least one scaled permission classification of said printer's permission profile.

11. The method of claim 9, wherein said method further comprises cancelling said document from printing upon determining that said network printer is not authorized to print said document.

12. The method of claim 11, further comprising securely deleting data of said document from a print queue.

13. The method of claim 9, wherein said determination is made automatically by a print server.

14. The method of claim 9, further comprising:
assigning a user permission profile to each user of a network including said network printers; and
determining from said user permission profile whether the corresponding user is authorized to print said document.

15. The method of claim 14, wherein said user is authorized to print documents having a permission classification matching that specified in said user permission profile or any lesser classification.

16. The method of claim 14, wherein said user is authorized to print only those documents having a permission classification matching at least one permission classification specified in said user permission profile.

17. A system for network printing, comprising:
a user having a user permission profile;
a document having a permission classification;
a network printer having a printer permission profile; and
means for determining whether said user permission profile authorizes said user to print said document based on said document's permission classification.

18. The system of claim 17, further comprising means for preventing said user from printing said document upon determining that said user is not authorized to print said document.

19. The system of claim 17, further comprising means for determining whether said user permission profile of said user authorizes said user to print documents using said network printer based on said printer permission profile.

20. The system of claim 19, further comprising means for preventing said user from printing said document upon determining that said user is not authorized to use said network printer.

* * * * *

UNITED STATES PATENT AND TRADEMARK OFFICE
CERTIFICATE OF CORRECTION

| | |
|---|---|
| PATENT NO. | : 8,305,604 B2 |
| APPLICATION NO. | : 11/788225 |
| DATED | : November 6, 2012 |
| INVENTOR(S) | : Kevin McIntyre |

It is certified that error appears in the above-identified patent and that said Letters Patent is hereby corrected as shown below:

In column 12, line 17, in Claim 20, delete "of 19," and insert -- of claim 19, --, therefor.

Signed and Sealed this
Nineteenth Day of March, 2013

Teresa Stanek Rea
*Acting Director of the United States Patent and Trademark Office*